(12) United States Patent
Kudo et al.

(10) Patent No.: US 11,796,985 B2
(45) Date of Patent: Oct. 24, 2023

(54) INDUSTRIAL EQUIPMENT CONTROLLER AND INDUSTRIAL EQUIPMENT DATA COLLECTION SYSTEM

(71) Applicant: KABUSHIKI KAISHA YASKAWA DENKI, Kitakyushu (JP)

(72) Inventors: Masaomi Kudo, Kitakyushu (JP); Yu Katono, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 362 days.

(21) Appl. No.: 17/165,946

(22) Filed: Feb. 3, 2021

(65) Prior Publication Data

US 2021/0165393 A1 Jun. 3, 2021

Related U.S. Application Data

(63) Continuation of application No. PCT/JP2019/029659, filed on Jul. 29, 2019.

(30) Foreign Application Priority Data

Aug. 31, 2018 (JP) ................................ 2018-163053

(51) Int. Cl.
*G05B 19/418* (2006.01)
*G06F 1/10* (2006.01)

(52) U.S. Cl.
CPC .... *G05B 19/4183* (2013.01); *G05B 19/41865* (2013.01); *G05B 19/41885* (2013.01); *G06F 1/10* (2013.01)

(58) Field of Classification Search
CPC ......... G05B 19/4183; G05B 19/41865; G05B 19/41885; G05B 19/042; G06F 1/10
See application file for complete search history.

(56) References Cited

U.S. PATENT DOCUMENTS

| | | | | |
|---|---|---|---|---|
| 5,287,010 A | * | 2/1994 | Hagiwara | H04L 7/0083 714/E11.017 |
| 6,173,207 B1 | * | 1/2001 | Eidson | G05B 19/4185 702/187 |
| 6,552,817 B1 | * | 4/2003 | Hasegawa | G06K 15/00 358/1.15 |
| 6,998,996 B1 | | 2/2006 | Eidson | |

(Continued)

FOREIGN PATENT DOCUMENTS

| | | |
|---|---|---|
| JP | 2010-246336 | 10/2010 |
| JP | 2011-172350 | 9/2011 |

(Continued)

OTHER PUBLICATIONS

Japanese Office Action for corresponding JP Application No. 2020-540168, dated Sep. 3, 2021 (w/ English machine translation).

(Continued)

*Primary Examiner* — Christopher E. Everett
(74) *Attorney, Agent, or Firm* — MORI & WARD, LLP

(57) ABSTRACT

A controller includes a port via which a control command is output to an industrial equipment at every control cycle, a clock configured to generate a control clock based on which the control cycle is generated, and a time counter configured to count a time counter value at every cycle that is equal to the control cycle.

16 Claims, 7 Drawing Sheets

(56) References Cited

U.S. PATENT DOCUMENTS 7,983,769 B2 * 7/2011 Chaffee ............... H04J 3/0664
　　　　　　　　　　　　　　　　　　　　　　　700/86
2019/0171192 A1 6/2019 Nishiyama et al.

FOREIGN PATENT DOCUMENTS

| JP | 2015-219616 | 12/2015 |
| JP | 2017-79009 | 4/2017 |
| JP | 2018-151918 | 9/2018 |

OTHER PUBLICATIONS

Extended European Search Report for corresponding EP Application No. 19853352.3-1205, dated Apr. 21, 2022.
International Search Report for corresponding International Application No. PCT/JP2019/029659, dated Oct. 29, 2019.
Written Opinion for corresponding International Application No. PCT/JP2019/029659, dated Oct. 29, 2019.

* cited by examiner

FIG. 6

Logging Data

| Acquisition Time (Counter Calendar Information) | Sensor Value | Speed Command | Output Speed | Torque Command |
|---|---|---|---|---|
| July 17, 2018 14 : 35 : 07 : 123456.78 μs | ◇◇◇ | ■■■ | ×××  | △△△ |
| July 17, 2018 14 : 35 : 07 : 123581.78 μs | ◇◇◇ | ■■■ | ××× | △△△ |
| July 17, 2018 14 : 35 : 07 : 123706.78 μs | ◇◇◇ | ■■■ | ××× | △△△ |
| July 17, 2018 14 : 35 : 07 : 123831.78 μs | ◇◇◇ | ■■■ | ××× | △△△ |
| July 17, 2018 14 : 35 : 07 : 123956.78 μs | ⋯⋯ | ⋯⋯ | ⋯⋯ | ⋯⋯ |

(Ta = 125.00 μs Cycle Count-up)

INDUSTRIAL EQUIPMENT CONTROLLER AND INDUSTRIAL EQUIPMENT DATA COLLECTION SYSTEM

CROSS-REFERENCE TO RELATED APPLICATIONS

The present application is a continuation application of International Application No. PCT/JP2019/029659, filed Jul. 29, 2019, which claims priority to Japanese Patent Application No. 2018-163053, filed Aug. 31, 2018. The contents of these applications are incorporated herein by reference in their entirety.

BACKGROUND

Technical Field

The present embodiment relates to a controller and a data collection system.

Discussion of the Background

Japanese Unexamined Patent Application Publication No. 2015-219616 describes a monitoring control system including a time counter that increments for each execution unit time of processing of plant equipment state data.

SUMMARY

According to one aspect of the present invention, a controller includes a port via which a control command is output to an industrial equipment at every control cycle, a clock configured to generate a control clock based on which the control cycle is generated, and a time counter configured to count a time counter value at every cycle that is equal to the control cycle.

According to another aspect of the present invention, a data collection system includes a superordinate controller which includes a data receiver, and a controller which is configured to be controlled by the superordinate controller and output a control command to industrial equipment. The controller includes a clock configured to generate a control clock; a time counter configured to count a time counter value at every cycle that is equal to a control cycle synchronized with the control clock; a command transmitter configured to transmit the control command to the industrial equipment at the control cycle, the control command including a data acquisition command to start acquiring data relating to the industrial equipment; a transmission time storage configured to store a transmission time at which the command transmitter transmits the control command; a logging data generator configured to generate logging data by relating time information which is obtained based on the transmission time to the data; and a data transmitter configured to transmit the logging data to the data receiver of the superordinate controller.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

FIG. 6 is a diagram schematically illustrating logging data.

DESCRIPTION OF EMBODIMENTS

Hereinafter, an embodiment will be described with reference to the drawings.

<Overall Configuration of Data Collection System>

An example of an overall configuration of a data collection system for industrial equipment according to the present embodiment will be described with reference to FIG. 1.

Figure 1:
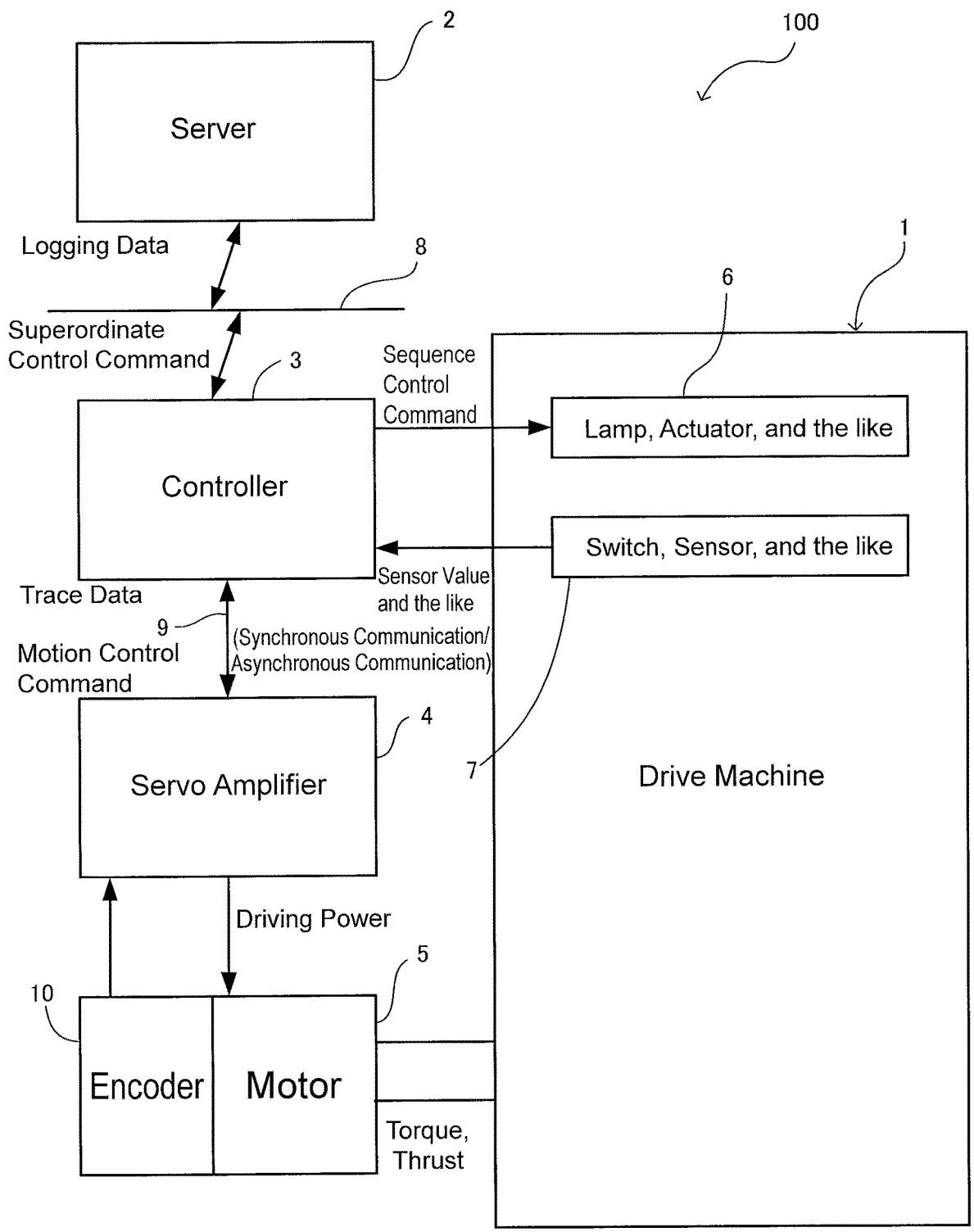
FIG. 1 is a diagram illustrating a schematic block configuration of a data collection system according to an embodiment.

FIG. 1 shows a schematic block configuration of a data collection system. In the example of the present embodiment, a description will be given of a control system that controls driving of a drive machine that is an industrial device, and a system that can also collect data for the purpose of predicting and optimizing an abnormality. As illustrated in FIG. 1, the data collection system 100 includes a drive machine 1, a server 2, a controller 3, a servo amplifier 4, and a motor 5.

The drive machine 1 is a machine system whose driving is controlled by the data collection system 100 and in which data related to the driving and the state is collected. As an internal configuration of the drive machine 1, most of the drive machine 1 is a mechanism portion whose operation is controlled by torque or thrust input from a motor 5 described later. The drive machine 1 according to the present embodiment further includes a display device such as a lamp directly controlled by the controller 3 described later, or various actuators 6 such as a solenoid and an air cylinder. In addition, the drive machine 1 also includes various switches, sensors 7, and the like, by which the controller 3 described later is possible to directly detect states and the detection values.

The server 2 (superordinate controller) is constituted by, for example, a general-purpose personal computer including a CPU and memories such as a ROM and a RAM (not shown). The server 2 outputs a superordinate control command for enabling the drive machine 1 to perform a driving operation according to a desired process to the controller 3 described later via the communication network 8 such as ETHERNET (registered trademark). Further, in the example of the present embodiment, the server 2 has a function of controlling the entire data collection system 100 so as to acquire various data related to the drive machine in accordance with an input operation from a user or a predetermined setting condition, and a function of receiving logging data (to be described later) in which the acquired various data in time series from the controller 3 and performing abnormality prediction or optimization of control of the drive machine 1 by data analysis such as machine learning based on the logging data.

The controller 3 includes a computer including a CPU and memories such as a ROM and a RAM. The controller 3 is a controller that controls the drive machine 1 to perform a desired operation over time based on a superordinate control command input from the server 2. Specifically, as the mode of the operation control function, which includes a motion control function of outputting a motion control command for instructing a motor 5, which is a main power supply of the power supply of the drive machine 1, to perform a desired motion operation in real time with high accuracy to a servo amplifier 4 (described later) via a so-called field network 9. As another mode of operation control, the controller 3 also has a sequence control function of outputting a sequence control command for instructing the lamp, the various actuators 6, and the like included in the drive machine 1 to operate over time via an interface such as an I/O port (refer to FIG. 2 described later) included in the controller 3. The controller 3 of this example also has a function of sequentially reading state information, sensor values, and the like from the various switches and sensors 7 included in the drive machine 1 via an interface such as the I/O port (refer to FIG. 3 described later). In addition, in the example of the present embodiment, it has a function of chronologically arranging various data related to the drive machine 1 received from the servo amplifier 4 described later together with the state information, the sensor value, and the like read by the I/O port, generating the data as logging data, and transmitting the data to the server 2. The detailed configuration and function of the controller 3 will be described later with reference to FIG. 2.

The servo amplifier 4 is constituted by a computer including a CPU and memories such as a ROM and a RAM, which are not particularly shown, and is a motor controller that supplies driving power to the motor 5 described later to perform drive control so as to follow the motion control command received from the controller 3 in real time and with high accuracy. In addition, in the example of the present embodiment, the servo amplifier 4 also has a function of sequentially acquiring and recording various data such as a torque command generated in the process of supplying driving power and an output speed and an output position actually output from the motor as time-series trace data and outputting the trace data to the controller 3. The acquisition function will be described later with reference to FIG. 3.

The motor 5 is, for example, a rotary or linear motor, and generates torque or thrust for driving the operation of the drive machine 1 by the driving power supplied from the servo amplifier 4. The motor 5 in this example is assumed to be of a rotary type, and the motor 5 is provided with an encoder 10 for optically detecting an output position (rotational position) thereof. When the motor 5 is of a direct-acting type, a linear scale or the like is provided instead of the encoder 10.

In the system configuration described above, particularly in the field network 9 for transmitting and receiving information between the controller 3 and the servo amplifier 4, it is possible to switch between synchronous communication for ensuring real-time performance when transmitting and receiving motion control commands and asynchronous communication for transmitting and receiving information with relatively low priority (will be described in detail later). In such a field network 9, the synchronous communication and the asynchronous communication may be implemented by the same protocol on the same cable line, or the synchronous communication and the asynchronous communication may be implemented separately.

In addition, the controller 3 generates logging data in which information on the acquisition time is attached to various data including the trace data in units of individual data (will be described later in detail). Then, the server 2 that has received the logging data performs abnormality prediction and optimization of control of the drive machine 1 by analyzing the data based on each acquisition time.

In the system configuration described above, the drive machine 1, the servo amplifier 4, and the motor 5 correspond to industrial equipment described in the claims. The motion control command corresponds to a control command described in each claim. A processing function unit in the controller 3, which is configured to transmit the logging data, corresponds to a data transmitter described in each claim. A processing function unit in the server 2, which is configured to receive the logging data, corresponds to a data receiver described in each claim.

<Detailed Configuration of Controller>

Figure 2:
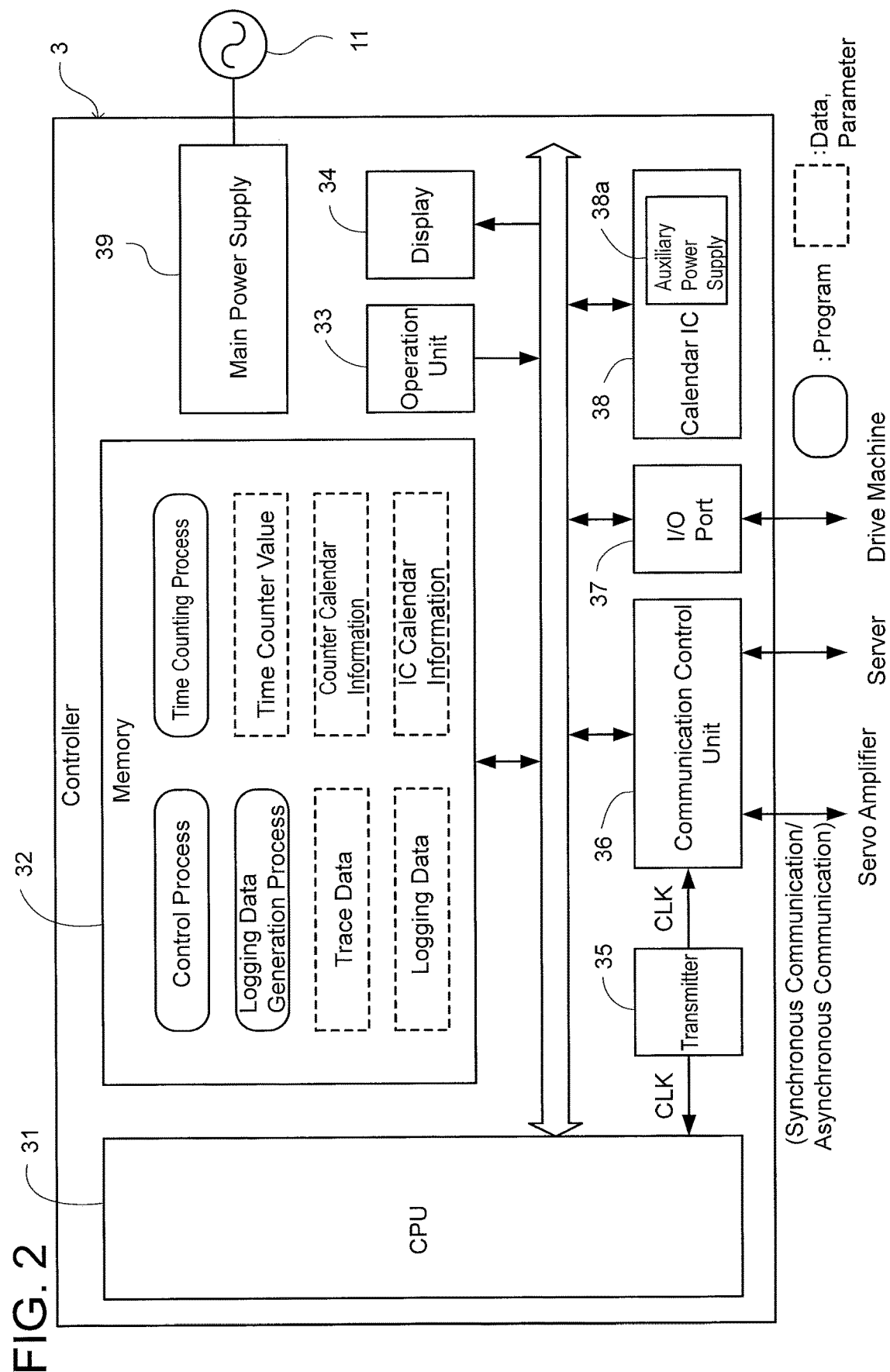
FIG. 2 is a diagram illustrating a control block configuration of a controller.

FIG. 2 is a control block diagram showing a detailed internal configuration of the controller 3. The controller 3 includes a CPU31, a memory 32, an operation unit 33, a display 34, a transmitter 35, a communication control unit 36, an I/O port 37, a calendar IC 38, and a main power supply 39.

The CPU31 has a function of controlling the entire controller 3 by transmitting and receiving commands and information to and from each part of the controller 3 based on various programs, information, and parameters stored in a memory 32 described later.

The memory 32 is a storage device configured by a ROM, a RAM, a flash memory, an HDD, or the like, and stores various programs executed by the CPU31, and information and parameters transmitted and received from the CPU31 or other functional parts. The contents of information stored in the memory 32 in this embodiment will be described later in detail.

The main power supply 39 is a power supply unit that, for example, rectifies and smooths power from the external commercial power supply 11 and supplies DC power to each unit of the controller 3. The main power supply 39 has a switch function of switching between an energized state and a non-energized state of the entire controller 3 by an arbitrary operation from a user (switching between ON and OFF of the power supply).

In this example, the operation unit 33 includes various switches (not shown) and has a function of receiving an operation input from a user.

In this example, the display 34 includes an LED lamp, an LED segment, a liquid crystal display, or the like, which is not particularly illustrated, and has a function of displaying information related to various commands and states to the user. In the example of the present embodiment, the display 34 can display at least one of a time counter value, counter calendar information, and IC calendar information, which will be described later, from the user via the operation unit 33.

In the present embodiment, the transmitter 35 is a clock to generate the control clock CLK for synchronization control of the controller 3. In this embodiment, for example, the transmitter 35 generates pulses of the control clock CLK at frequencies around 1 GHz and inputs the pulses to the CPU31 and the communication control unit 36, respectively. The communication control unit 36 is described later.

The communication control unit 36 has a function of respectively controlling transmission and reception of information between the CPU31 and the server 2 via the communication network 8 and transmission and reception of information between the CPU 31 and the servo amplifier 4 via the field network 9. The communication control unit 36 performs switching between synchronous communication and asynchronous communication with respect to the field network 9 as described above, and particularly in the case of synchronous communication, transmits a motion control command or the like at a predetermined control cycle synchronized with the control clock CLK input from the transmitter 35.

As described above, the I/O port 37 is an interface through which the CPU 31 of the controller 3 outputs a sequence control command to the actuator 6 or the like of the drive machine 1 and through which the CPU 31 transmits and receives information when reading a sensor value or the like from the sensor 7 or the like of the drive machine 1.

The calendar IC 38 is a dedicated integrated circuit such as an application specific integrated circuit (ASIC) having a time measurement function. The calendar IC 38 is also referred to as a first calendar IC. In this example, the calendar IC 38 generates IC calendar information expressed by the absolute time of "year/month/day/hour/minute/second" based on the standard time of the time zone to which the operation location of the data collecting system 100 belongs. This IC calendar information is also referred to as first IC calendar information. The calendar IC 38 is driven by an auxiliary power supply 38a such as a battery provided therein, and the calendar information is always generated regardless of the energization state of the main power supply 39 ((i.e., ON/OFF of the power supply of the controller 3).

The controller 3 according to the present embodiment configured as described above allows the CPU 31 to execute three processing programs mainly stored in the memory 32, namely, the control processing program, the time counting processing program, and the logging data generation processing program, and thereby time information with high time measurement accuracy can be provided to the collected data for data analysis as well as controlling driving of the drive machine 1.

The control processing program is a program for generating and transmitting a motion control command for the servo amplifier 4 and a sequence control command for the various actuators 6 of the drive machine 1 based on the superordinate control command received from the server 2 as described above, and enabling the drive machine 1 to perform a desired operation over time. The transmission processing function unit of the motion control command executed by the CPU 31 in accordance with the control processing program corresponds to a command transmitter described in each claim.

The time counting processing program is a program for independently counting the time counter value and the counter calendar information, which are time measurement parameters, with high time measurement accuracy while referring to the integrated circuit calendar information acquired from the calendar IC 38. The time measurement method by the time counting processing program will be described later in detail. In addition, the time measurement processing function unit of the time counter value executed by the CPU 31 in the time counting processing program corresponds to an time counter described in each claim.

The logging data generation processing program is a program for arranging the trace data received from the servo amplifier 4 and various data read by the I/O port 37 together in time series, and adding the information of the acquisition time indicated by the time measurement parameter to each data unit to generate the logging data. A generation processing function unit of the logging data which is executed by the CPU 31 in the logging data generation processing program corresponds to a logging data generator described in each claim.

Although many other programs, various data, and parameters are stored in the memory 32, they are not shown in the drawing.

<Data Transmission/Reception Method Between Controller and Servo Amplifier>

Next, a method of transmitting and receiving data between the controller 3 and the servo amplifier 4 in the data collection system will be described with reference to FIG. 3. As described above, the two nodes of the controller 3 and the servo amplifier 4 can sequentially acquire and store various data related to the operation control and the state of the drive machine 1 individually. In the illustrated example, the controller 3 itself independently detects a sensor value indicating the state from the sensor 7 included in the drive machine 1 via the I/O port 37, and records the sensor value as time series data. In this case, the CPU 31 of the controller 3 reads the sensor value at a predetermined cycle by interrupt processing originally implemented as a function on the hardware circuit.

In the illustrated example, the controller 3 outputs a speed command calculated to be output from the motor 5 to the servo amplifier 4 as a motion control command, that is, speed control is performed, and the motion control command is transmitted and received from the controller 3 to the servo amplifier 4 by the synchronous communication of the field network 9. At this time, the communication control units for the field network 9 included in the controller 3 and the servo amplifier 4 sequentially transmit and receive the motion control command in the same cycle (hereinafter referred to as a synchronous communication cycle Ta) in which the phase difference is sufficiently small and sufficiently short. The communication control unit for the field network 9 corresponds to the communication control unit 36 shown in FIG. 2 in the case of the controller 3. Thus, even when the motion control command transmitted from the controller 3 varies with time, the servo amplifier 4 can perform follow-up control corresponding to the variation of the motion control command with sufficient real time property. The actual synchronous communication cycle Ta itself is generated by multiplying the very short cycle Tc of the control clock CLK generated by the transmitter 35 of the controller 3 by about several thousand to several hundred thousand times. The CPU 31 and the communication control unit 36 operating in the cycle Tc unit of the control clock CLK can execute the synchronization task for the synchronous communication cycle Ta with a clock margin having a sufficient margin. The cycle Tc is, for example, on the order of several ns. See the enlarged view of portion A in the figure. The synchronous communication cycle Ta is, for example, 125 μs.

In the illustrated example, the servo amplifier 4 sequentially acquires and records various data such as an output speed actually output from the motor 5 as a result of follow-up control of the motion control command received by the synchronous communication and a torque command generated in the process of the follow-up control as time-series trace data. The output speed may be calculated by calculating the output position detected from the encoder 10 by time differentiation or the like. Data acquisition processing in the servo amplifier 4 is started when a trace start command is included in motion control commands sequentially received from the controller 3.

The servo amplifier 4 in this example executes the follow-up control of the motion control command as a synchronous task synchronized with the synchronous communication cycle Ta, and also sequentially executes the acquisition processing of various data in synchronization with the same synchronous communication cycle Ta. However, since the synchronous communication cycle Ta is very short, it is difficult for the servo amplifier 4 to sequentially return various trace data to the controller 3 for each synchronous communication cycle Ta. Therefore, when the trace data having a large data capacity acquired by the servo amplifier 4 is returned to the controller 3, the trace data is collectively returned by asynchronous communication performed at an arbitrary timing during the non-execution period of the synchronous task.

Then, the controller 3 collects various trace data received from the servo amplifier 4 together with the time-series data of the sensor value and the motion control command detected by the controller 3 itself, and generates logging data to which information of the acquisition time is attached in each data unit. Although the types of time-series data shown in FIG. 3 are limited due to space limitations, various types of time-series data such as sequence control commands directly output from the controller 3 to the drive machine 1, output positions detectable by the servo amplifier 4, speed deviations, and estimated disturbances may be included in the logging data (trace data).

The synchronous communication cycle Ta corresponds to a predetermined control cycle and a transmission cycle described in each claim, and the trace start command corresponds to a data acquisition command described in each claim.

Features of the Embodiments

As described above, an industrial equipment system as general factory automation often includes a controller that outputs a control command to the industrial equipment. In the present embodiment, the industrial equipment corresponds to, for example, the drive machine 1, and the controller corresponds to, for example, the controller 3. In such an industrial equipment system, in recent years, a controller has been required to have a time measurement function capable of counting time with high time measurement accuracy. This is because, for example, when collecting various types of data used for data analysis for the purpose of abnormality prediction and optimization in operation control of an industrial equipment system, high time measurement accuracy is required for the collection time.

Up to now, a configuration has been often adopted in which IC calendar information in absolute time notation measured at a dedicated calendar IC 38 driven by an auxiliary power supply such as a battery is read out. However, since it takes a long time to read the calendar information in absolute time notation from the individually driven calendar IC 38, the read cycle must be set large. In the example shown in FIG. 3, the read cycle is 0.5 s. In addition, since the time measurement accuracy of the calendar IC 38 of the existing product is very low (that is, the time length of the minimum time measurement unit is large and rough, for example, 1 second), and a time measurement error easily occurs, the above-described high time measurement accuracy cannot be obtained. The time measurement error is, for example, about one minute per month. On the other hand, when the time is measured with excessively high time measurement accuracy, processing resources of the controller are wasted, and the entire control function is degraded.

In contrast, in the present embodiment, the controller 3, which is a controller, includes the transmitter 35 that generates the control clock CLK of the controller 3, and the CPU31 executes the time counting processing program that counts the time counter value at the same cycle as the predetermined synchronous communication cycle Ta based on the control clock CLK.

Thus, the controller 3 itself can implement its own time measurement function by simple processing of counting the time counter value in synchronization with the control clock CLK without using a dedicated circuit such as the calendar IC 38. Then, the counting is executed at the same cycle as the synchronous communication cycle Ta at which the motion control command is output to the industrial equipment. Thus, it is possible to secure the time measurement accuracy suitable for collection of various data to be analyzed for the purpose of, for example, the above-described abnormality prediction or optimization while suppressing excessive consumption of the processing resource of the controller 3. Even when an error occurs in the cycle itself of the control clock CLK (that is, when a time measurement error occurs), since the time measurement is performed by the time counter value counted in the same cycle as the predetermined synchronous communication cycle Ta synchronized with the same control clock CLK, for example, there is no problem in the time measurement accuracy of the data collection. Hereinafter, such a time measurement method will be sequentially described in detail.

<Time Counting Processing of the Embodiments>

First, the specification of the time counter value in the example of the present embodiment will be described. As described above, the time counter value is a time measurement parameter recorded on the memory 32 of the controller 3 and used only inside the controller 3, and is recorded in the form of 64-bit integer binary data in the example of the present embodiment. When the time counter value is handled on application software such as the logging data generation processing program, a decimal point is added so that one bit corresponds to 0.01 µs. Specifically, for example, when the value of the time counter value is an integer value "12345" in decimal notation, it is handled as "123.45 µs" on the application software. Even if one bit is allocated to 0.01 µs, a time length of about 2924 years can be measured with 64-bit-data.

Figure 3:
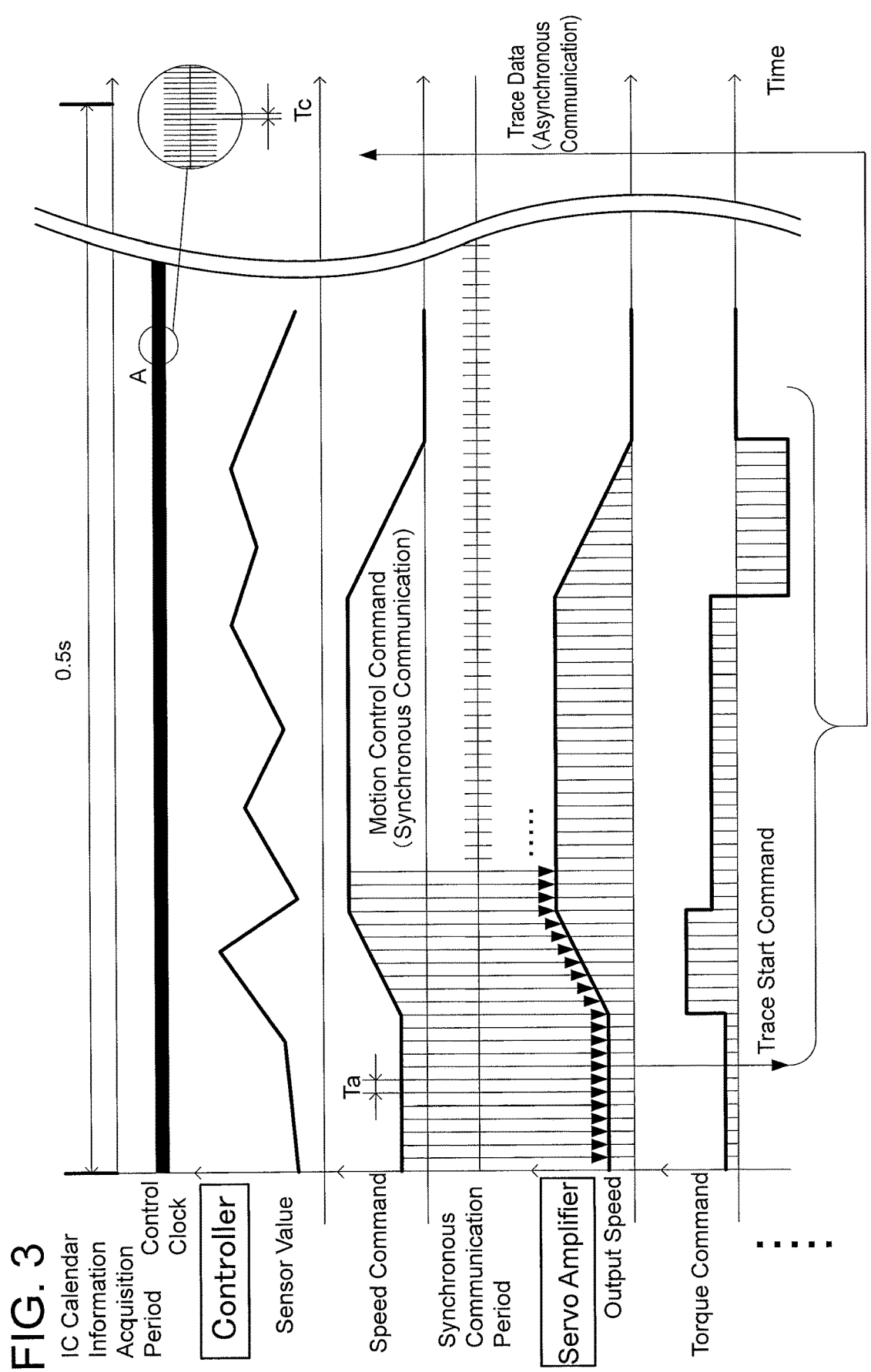
FIG. 3 is a time chart showing a method of transmitting and receiving data between the controller and the servo amplifier.
Figure 4:
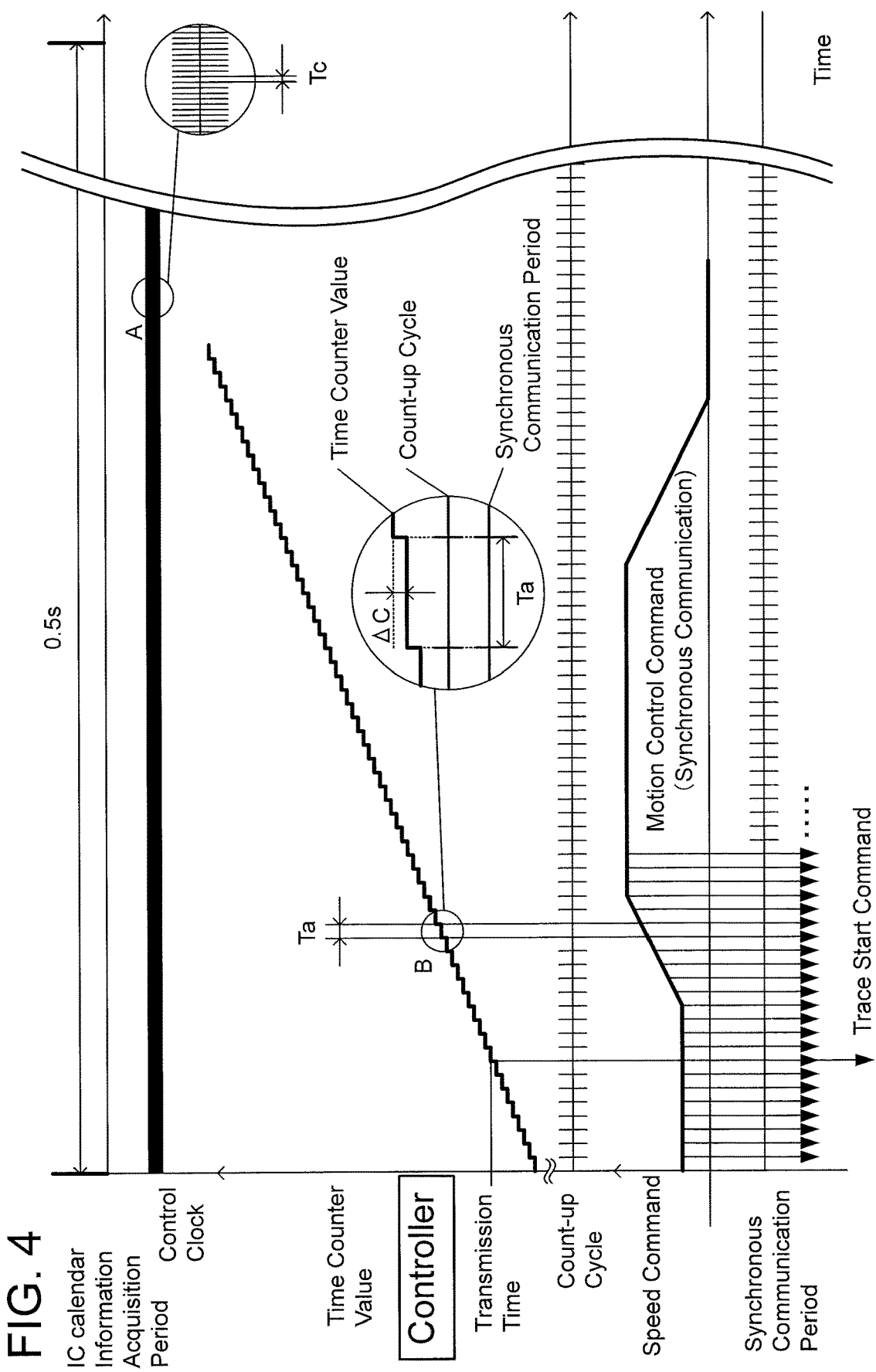
FIG. 4 is a diagram illustrating a time counting process of the time counter value.

In the present embodiment, as shown in FIG. 4 corresponding to FIG. 3, the time counter value is continuously counted up and counted while the main power supply 39 of the controller 3 is in the energized state regardless of the content of the motion control command and the presence or absence of the trace processing of data. That is, the CPU31 of the controller 3 executes the time counting processing program for each count-up cycle that is the same as the synchronous communication cycle Ta and counts up the time counter value by interrupt processing implemented as a function on the hardware circuit (see the enlarged view of the portion B in the drawing). The addition value Δ C at the time of counting up is added by the number of bits corresponding to the time length of the synchronous communication cycle Ta. For example, when the synchronous communication cycle Ta is 125 µs, the one-time count-up addition value Δ C with respect to the time counter value is "12500 (=125.00µs)" in decimal notation.

When the controller 3 transmits the motion control command including the trace start command, the time counter value at that time is separately stored in the memory 32 as the transmission time, so that the acquisition time of the first data of the trace data returned from the servo amplifier 4 thereafter can be estimated based on the transmission time (the same time in the example of the present embodiment). The processing function unit that stores the transmission time of the motion control command corresponds to a transmission time storage described in each claim.

<Cumulative Time Measurement Processing of Time Counter Value>

Figure 5:
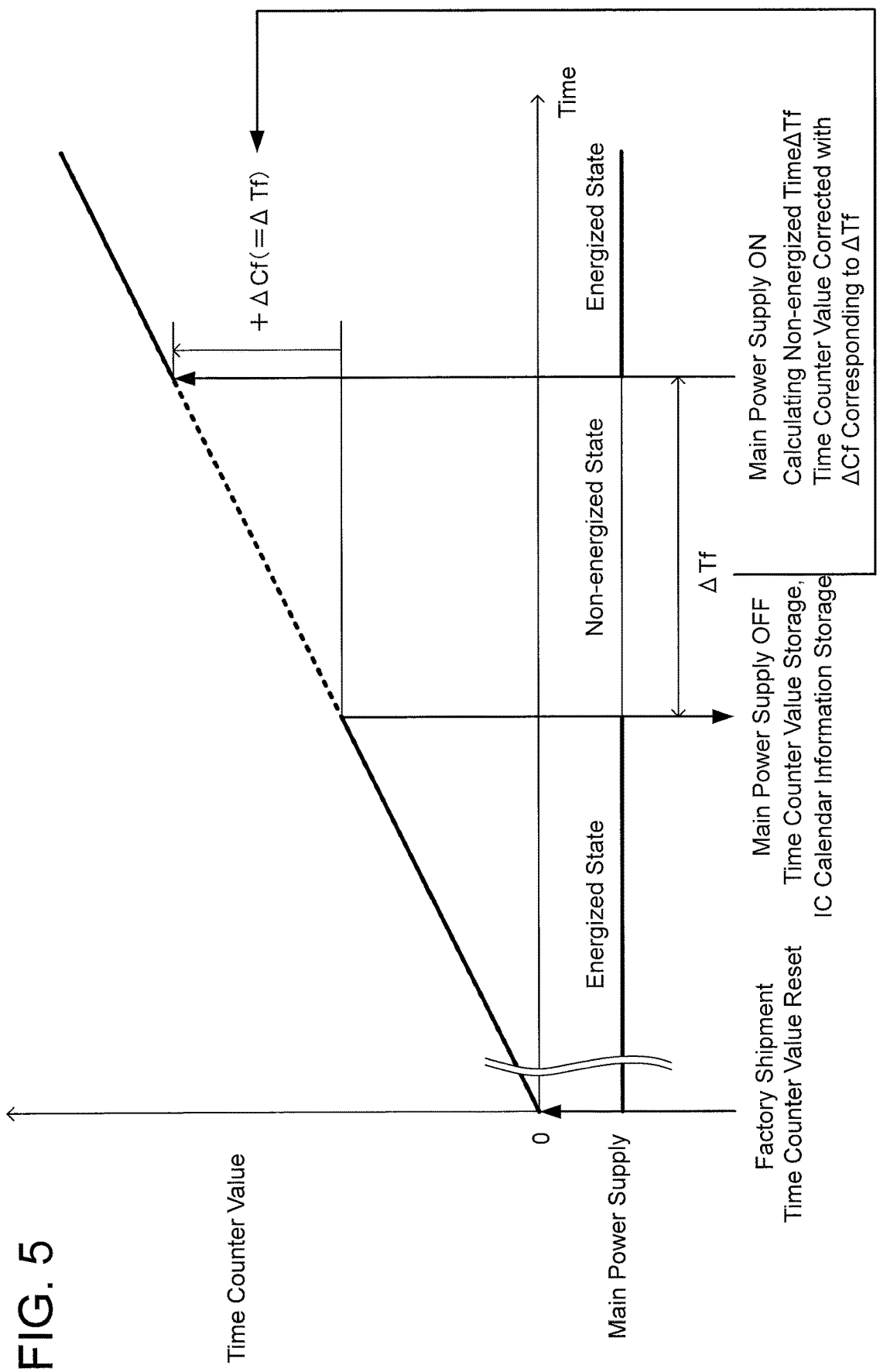
FIG. 5 is a diagram illustrating a cumulative time measurement process of time counter value.

Further, in the example of the present embodiment, in the time counting processing program, the time counter value is processed so as to be cumulatively counted as the total elapsed time from the factory shipment of the controller 3. That is, as shown in FIG. 5, when an individual (lot) of the controller 3 is manufactured in a factory or shipped, the time counter value is initialized to "0" and reset. As described above, while the main power supply 39 of the controller 3 is in the energized state, the time counter value is continuously counted up at all times.

Thereafter, every time the main power supply 39 of the controller 3 is cut off (OFF), the time counter value at that time and the calendar information of the calendar IC 38 are stored in a nonvolatile memory (not shown) such as a flash memory or an HDD. Every time the main power supply 39 is energized (ON), the controller 3 calculates the immediately preceding non-energized period ΔTf from the difference between the integrated circuit calendar information of the calendar IC 38 detected at that time and the integrated circuit calendar information stored in the memory 32. The non-energized period is a period in which the main power supply 39 is not turned on. The controller 3 further adds the count-up addition value ΔCf corresponding to the non-energized period ΔTf to the time counter value.

By performing the time measurement process as described above, the time counter value can be measured as the total elapsed time from the shipment of the individual controller 3 from the factory. In this case, in order to suppress the time measurement error of the time counter value, the time correction of the calendar IC 38 is not performed at least during the non-energized period of the main power supply 39. The time counter value is basically prevented from being arbitrarily reset by an operation input from the user, but may be reset on the manufacturer side by using, for example, a special tool closed to the user.

<Logging Data>

The CPU31 of the controller 3 which received trace data from the servo amplifier 4 executes the logging data generation processing program and thereby generates logging data, as shown in FIG. 6, of which the trace data is added to the data acquired by the controller 3 itself from drive machine 1. In the example of the present embodiment, since the controller 3 itself also acquires data at the synchronous communication cycle Ta, all data can be normalized at the same acquisition start timing (=transmission time), the same period, and the same sampling period, that is, data synchronization can be performed. Even when the sampling periods of the data are different between the controller 3 side and the servo amplifier 4 side, the data may be extracted for the same acquisition period and may be sampled with the synchronous communication cycle Ta as the reference sampling period.

In the logging data, the acquisition time is assigned to each data unit. Specifically, the acquisition time of the n-th (n=0, 1, 2,) data is given by counter calendar information obtained by converting a time counter value obtained by adding n×sampling period (=synchronous communication cycle Ta, count-up addition value Δ C) to a time counter value (=transmission time) when the trace start command is transmitted into absolute time notation. Since the counter calendar information in absolute time notation is assigned as the acquisition time in each data unit in the logging data, even when a large amount of data is acquired and stored, the acquisition time can be uniquely recognized in the data unit. The counter calendar information corresponds to the first counter calendar information described in each of the claims, and a logging data generation processing function unit of the counter calendar information which is executed by the CPU31 in the logging data generation processing program corresponds to the first calendar information generator described in each of the claims.

Further, since the counter calendar information is generated on the basis of the time counter value measured at the same count-up cycle as the synchronous communication cycle Ta, the counter calendar information can be provided with much higher time measurement accuracy than the IC calendar information detected from the calendar IC 38 and with time measurement accuracy suitable for data analysis. In addition, as described above, since the time counter value is cumulatively measured as the total elapsed time from the factory shipment of the individual controller 3, the counter calendar information generated based on the time counter value can also be provided as a time that can be uniquely specified in a non-overlapping manner in the individual controller 3.

Effects of the Embodiments

As described above, according to the data collection system 100 of the present embodiment, the controller 3 itself can implement its own time measurement function by simple processing of counting up the time counter value in synchronization with the control clock CLK without using a dedicated circuit such as a calendar IC 38. Then, the count-up is executed for each count-up cycle which is the same as the synchronous communication cycle in which the motion control command is output to the industrial equipment, and thus it is possible to secure time measurement accuracy suitable for collection of various data of an analysis target for the purpose of, for example, the above-described abnormality prediction or optimization while suppressing excessive consumption of the processing resource of the controller 3. Further, even when an error occurs in the cycle itself of the control clock CLK (that is, when a time measurement error occurs), since the time measurement is performed by the time counter value counted up at the same count-up cycle as the synchronous communication synchronized with the same control clock CLK, for example, there is no problem in the time measurement accuracy of the data collection. As a result, the time measurement function of the controller 3 can be improved. It should be noted that the time measurement process to the time counter value performed at the same cycle as the synchronous communication cycle Ta is not limited to the count-up and may be count-down.

In particular, in the present embodiment, the controller 3 transmits a motion control command that can include a trace start command instructing the servo amplifier 4 to start acquisition of trace data, and counts the time counter value at the same cycle as the synchronous communication cycle Ta that is the transmission cycle of the motion control command. Accordingly, the controller 3 can cause the servo amplifier 4 to acquire the trace data of the analysis target for the purpose of abnormality prediction and optimization control of the drive machine 1, and can count the time counter value with time measurement accuracy suitable for collection of the trace data. The motion control command may not include the trace start command.

In addition, particularly in the present embodiment, the counter calendar information in which the time information is represented in the form of absolute time (time represented by "year/month/day/hour/minute/second/0.01 μ s") is generated based on the time counter value. Thus, the controller 3 can independently measure calendar information as absolute time information with high time measurement accuracy without using a dedicated circuit such as a calendar IC 38. It should be noted that the counter calendar information may be generated by time information expressed in another format such as Japanese calendar-based or relative time from an arbitrary reference time, in addition to the above-described format of absolute time based on Western calendar.

Further, particularly in the present embodiment, the transmission time when the motion control command including the trace start command is transmitted is stored, and the logging data in which the counter calendar information is attached to the trace data received from the servo amplifier 4 is generated based on the transmission time. Thus, the controller 3 processes the received trace data as logging data arranged by time, and can improve the applicability to data analysis.

In particular, in the present embodiment, the controller 3 transmits a motion control command to the servo amplifier 4 serving as a motor controller that drives and controls the motor 5 that drives the drive machine 1, and the trace data received from the servo amplifier 4 is data relating to the drive control of the motor 5 acquired by the servo amplifier 4. Thus, the controller 3 can collect trace data as data that can be specifically analyzed for the purpose of abnormality prediction and optimization control of the drive machine 1.

Further, particularly in the present embodiment, the controller 3 adds the counter calendar information to the data such as the sequence control command and the sensor value acquired by the controller 3 itself and includes the data in the logging data. Accordingly, the controller 3 can add the counter calendar information corresponding to the transmission time to the data acquired by the controller 3 itself from, for example, the I/O port 37 without using the servo amplifier 4 or the like, and can include the data in the logging data.

Further, particularly in the present embodiment, the controller 3 counts the count counter value as the accumulated time including the non-turn-on period (non-energized period) of the main power supply 39 of the controller 3. As a result, the controller 3 can acquire the time counter value detected at a certain point in time as a time that can be uniquely specified in a non-overlapping manner. Therefore, even when the measured time of the calendar IC 38 is corrected by winding, rewinding, or changing to the use country time, the counter calendar information can be uniquely generated without being affected by the correction.

Particularly in the present embodiment, the controller 3 resets the time counter value at the time of factory manufacture or shipment of the individual controller 3. Thus, the controller 3 can measure the time counter value as the total elapsed time since the controller 3 itself was manufactured.

Further, in the present embodiment, particularly, there is provided a calendar IC 38 for generating integrated circuit calendar information indicating the time measured by driving with an auxiliary power supply different from the main power supply 39, and the time counter value is corrected based on the integrated circuit calendar information at the start of turning on the main power supply 39. Thus, even when the controller 3 is in a non-energized state, that is, even when the main power supply 39 is in a non-energized state, the time counter value can be corrected by the time difference corresponding to the non-energized period, and the uniqueness can be maintained.

In particular, in the present embodiment, the display 34 that displays at least one of the time counter value, the counter calendar information, and the IC calendar information is provided. Thus, the user can visually confirm any one of the three types of clocking information managed by the controller 3.

Particularly in the present embodiment, the time counter value is 64-bit data in which one bit corresponds to 0.01 μs. The period of 0.01 μs represented by one bit is referred to as a unit time period. The controller 3 counts the time counter value by the number of bits corresponding to the time length of the synchronous communication cycle Ta. The time counter value can count up to about 2924 years. As a result, even when the synchronous communication cycle Ta is executed with a high time measurement accuracy of 0.01 μs, the time counter value can be measured with 64-bit binary data that can be easily handled by a general computer over a period of about 10 years, which is generally regarded as the service life of the controller 3, and the uniqueness thereof can be maintained.

<Modification>

Note that the disclosed embodiments are not limited to the above, and various modifications can be made without departing from the spirit and technical idea thereof. Hereinafter, such a modified example will be described.

<When the Server Generates Counter Calendar Information>

In the above-described embodiment, the counter calendar information is generated by the controller 3 itself on the basis of the time counter value measured by the controller 3. For example, the controller 3 may assign not the counter calendar information but a time counter value as the acquisition time in the logging data, and the server 2 that has received the logging data may generate and assign the counter calendar information again.

Figure 7:
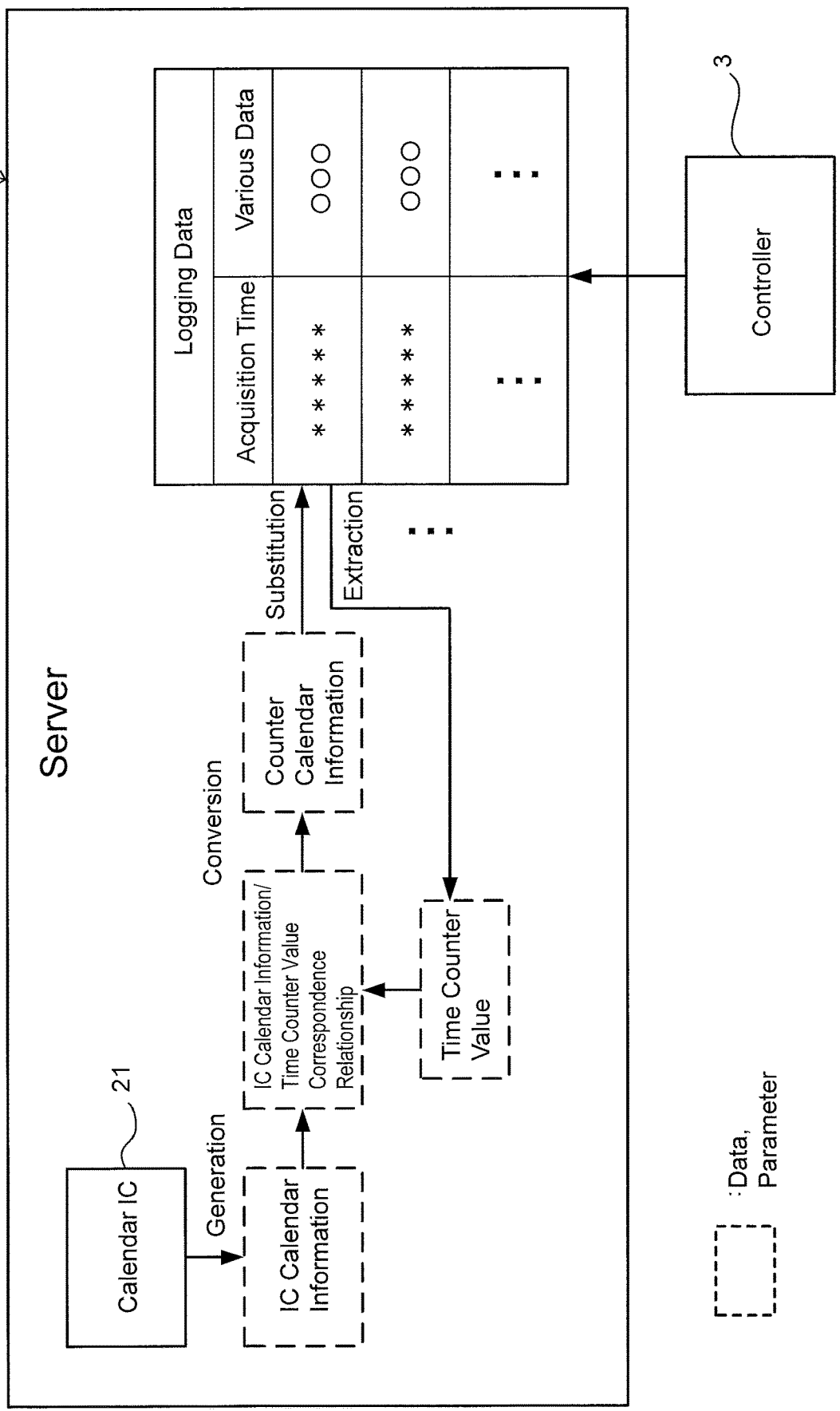
FIG. 7 is a diagram illustrating a case where the server generates counter calendar information.

In this case, as shown in FIG. 7, the server 2 has its own calendar IC 21, and it is necessary to confirm and manage in advance the correspondence relation between the IC calendar information of the calendar IC 21 and the time counter value of the controller 3. When the logging data is received from the controller 3, the acquisition time of each data is extracted, each is converted into counter calendar information based on the correspondence relation, and is replaced with the original logging data.

In this case, the calendar IC 21 provided in the server 2 corresponds to the second calendar IC. The IC calendar information corresponds to second IC calendar information described in each claim. A counter calendar information generation processing function unit executed by the CPU (not particularly shown) of the server 2 corresponds to a second calendar information generator described in each claim. The counter calendar information generated by the server 2 corresponds to second counter calendar information described in each claim. A processing function unit in which the CPU of the server 2 converts the time counter value into the counter calendar information corresponds to a time conversion unit described in each claim.

According to the modification described above, the server 2 can share the management of the counter calendar information in the predetermined format to be attached to the logging data, and the processing load of the controller 3 can be reduced. Although not particularly illustrated, the present modification is particularly useful when one server 2 is connected to a plurality of controllers 3 having the same configuration and receives respective logging data. That is, since the calendar IC 38 uniquely provided in each of the plurality of controllers 3 is likely to have different time measurement errors, when the acquisition time of each piece of logging data received by the server 2 is the counter calendar information based on each piece of integrated circuit calendar information, the same clocking error is likely to occur between the pieces of counter calendar information of the pieces of logging data. On the other hand, in this modification, the correspondence relationship between the same IC calendar information and the time counter value of each controller 3 is managed in advance based on the IC calendar information of the calendar IC included in the server 2. Thus, the acquisition time of each logging data can be uniformly replaced with the counter calendar information having high simultaneity on the same time axis.

In the above description, when there are descriptions such as "vertical", "parallel", and "plane", these descriptions do not have a strict meaning. That is, the terms "vertical", "parallel", and "plane" mean "substantially vertical", "substantially parallel", and "substantially plane", respectively, because design and manufacturing tolerances and errors are allowed.

In addition, in the above description, when there are descriptions such as "same", "equal", and "different" in terms of dimensions, sizes, shapes, positions, and the like in appearance, the descriptions do not have a strict meaning. That is, the terms "same", "equal", and "different" mean "substantially the same", "substantially equal", and "substantially different", respectively, with design and manufacturing tolerances and errors allowed.

In addition to those already described above, the techniques according to the embodiments and the modifications may be appropriately combined and used. In addition, although not illustrated, be made to the above—described embodiment and modifications without departing from the spirit of the invention.

What is claimed is:

1. A controller comprising:
   a port via which a control command is output to an industrial equipment at every control cycle;
   a clock configured to generate a control clock based on which the control cycle is generated;
   a time counter configured to count a time counter value at each cycle of the control cycle;
   a command transmitter configured to transmit the control command to the industrial equipment at every transmission cycle which is equal to the control cycle, the control command including a data acquisition command to instruct the industrial equipment to start acquiring data; and
   a first calendar information generator configured to generate first counter calendar information which includes time information that is described in a format based on the time counter value,
   wherein the time counter is configured to count the time counter value even during a period in which a main power supply does not supply power to the controller.

2. The controller according to claim 1, further comprising:
   a transmission time storage configured to store a transmission time at which the command transmitter transmits the control command; and
   a logging data generator configured to generate logging data by relating the first counter calendar information to the data based on the transmission time.

3. The controller according to claim 2, wherein
   the command transmitter is configured to transmit the control command to a motor controller to control a motor to drive the industrial equipment, and
   the data include data relating to control information of the motor acquired by the motor controller.

4. The controller according to claim 3, wherein the logging data generator is configured to attach the first counter calendar information to data acquired by the controller and to include the data in the logging data.

5. The controller according to claim 1, wherein the time counter is configured to reset the time counter value when the controller is shipped from a factory.

6. The controller according to claim 1, further comprising:
   a first calendar IC configured to generate first IC calendar information indicating a time at which an auxiliary power supply different from the main power supply starts supplying power, wherein the time counter is configured to correct the time counter value based on the first IC calendar information when the main power supply starts supplying power.

7. The controller according to claim 6, further comprising:
   a display configured to display at least one of the time counter value, the first counter calendar information, and the first IC calendar information.

8. The controller according to claim 1, wherein the time counter value is 64-bit data in which one bit corresponds to 0.01 μs, and the time counter is configured to count the time counter value at every predetermined number of bits corresponding to the time length of the control cycle.

9. The controller according to claim 1, wherein the time counter is configured to increase the time counter value at every cycle.

10. The controller according to claim 1, wherein the time counter value increases by an addition value at each cycle of the control cycle, the addition value being a constant valve at each cycle of the control cycle.

11. The controller according to claim 1, wherein the time counter value is cumulatively counted as a total elapsed time from a factory shipment of the controller.

12. A data collection system comprising:
    a superordinate controller comprising a data receiver; and
    a controller configured to be controlled by the superordinate controller and output a control command to industrial equipment, the controller comprising:
    a clock configured to generate a control clock;
    a time counter configured to count a time counter value at each cycle of a control cycle synchronized with the control clock;
    a command transmitter configured to transmit the control command to the industrial equipment at the control cycle, the control command including a data acquisition command to start acquiring data relating to the industrial equipment;
    a transmission time storage configured to store a transmission time at which the command transmitter transmits the control command;
    a logging data generator configured to generate logging data by relating time information which is obtained based on the transmission time to the data; and
    a data transmitter configured to transmit the logging data to the data receiver of the superordinate controller, wherein
    the logging data generator is configured to generate the logging data by relating the time counter value to the data, and the superordinate controller comprises
- a second calendar IC configured to generate second IC calendar information that is a time expressed in a predetermined format,
- a second calendar information generator configured to generate second counter calendar information expressed in a predetermined format from a correspondence relationship between the time counter value received from the controller and the second IC calendar information, and
- a time convertor configured to convert, to the second calendar information, the time counter value of the time information which is based on the transmission time related to the logging data and which is received from the controller.

13. The data collection system according to claim 12, wherein
the controller includes a first calendar information generator configured to generate first counter calendar information expressed in a predetermined format based on the time counter value, and
the logging data generator is configured to express the time information based on the transmission time in the first counter calendar information.

14. A controller comprising:
- a port via which a control command is output to an industrial equipment at every control cycle;
- a clock configured to generate a control clock based on which the control cycle is generated; and
- a time counter configured to count a time counter value at every cycle that is equal to the control cycle,
- wherein the time counter is configured to count the time counter value even during a period in which a main power supply does not supply power to the controller.

15. The controller according to claim 14, wherein the time counter is configured to reset the time counter value when the controller is shipped from a factory.

16. The controller according to claim 14, further comprising:
- a first calendar IC configured to generate first IC calendar information indicating a time at which an auxiliary power supply different from the main power supply starts supplying power, wherein the time counter is configured to correct the time counter value based on the first IC calendar information when the main power supply starts supplying power; and
- a display configured to display at least one of the time counter value, the first counter calendar information, and the first IC calendar information.

* * * * *